United States Patent
Boroujerdi et al.

(10) Patent No.: US 6,477,515 B1
(45) Date of Patent: Nov. 5, 2002

(54) EFFICIENT COMPUTATION OF LEAST COST PATHS WITH HARD CONSTRAINTS

(75) Inventors: Ali Boroujerdi, Springfield, VA (US); Jeffrey K. Uhlmann, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/372,161

(22) Filed: Aug. 11, 1999

(51) Int. Cl.$^7$ .............................................. G06F 15/18
(52) U.S. Cl. ........................ 706/14; 701/209; 701/200; 701/201; 701/120; 701/302
(58) Field of Search .................... 706/62, 19; 345/420, 345/440, 441; 714/738; 716/10, 2; 717/5; 707/100, 101, 2

(56) References Cited

U.S. PATENT DOCUMENTS

| | | | |
|---|---|---|---|
| 6,085,147 A | * 7/2000 | Myers ........................ | 701/209 |
| 6,098,107 A | * 8/2000 | Narvaez-Guarnieri et al. ........................... | 709/239 |
| 6,266,610 B1 | * 7/2001 | Schultz et al. .............. | 701/201 |

OTHER PUBLICATIONS

A. Boroujerdi et al., An Efficient Algorithm for Computing Least Cost Paths with Turn Constraints, 67 Information Processing Letters 317 (Elsevier 1998).

A. Boroujerdi et al., Empirical Analysis of New Methods for Computng Minimum Cost Paths with Turn Constraints, SPIE vol. 3366 (Part of the SPIE Conference on Robotic and Semi–Robotic Ground Vehicle Technology, Apr., 1998).

* cited by examiner

*Primary Examiner*—Thomas Black
*Assistant Examiner*—Joseph P Hirl
(74) *Attorney, Agent, or Firm*—John J. Karasek; Dorothy I. Becker (57) ABSTRACT

A system is disclosed for computing least cost paths under hard constraints such as turn angle constraints. In an explicit embodiment, a transformation is performed on a graph representation of an optimization problem to generate a transformed graph incorporating the hard constraint in the edges of the transformed graph. Unconstrained optimization is then performed on the transformed graph using an implementation of Dijkstra's algorithm. The structure of the transformed graph lends itself to searching for an optimal solution using data structures of the vertices of the original graph. In an implicit embodiment, the searching is performed using the data structures but without explicitly generating the transformed graph. The enhanced performance of the invention is sufficient to allow for dynamic re-routing of vehicles in uncertain or changing environments.

60 Claims, 8 Drawing Sheets

EFFICIENT COMPUTATION OF LEAST COST PATHS WITH HARD CONSTRAINTS

BACKGROUND OF THE INVENTION

1. Field of the Invention

The present invention relates to finding desirable paths between specified beginning and ending states of a physical system. More particularly, the invention relates to computing least cost paths for moving physical systems from beginning states to ending states through one or more intermediate states, where the reachable states from each given state are limited by hard constraints.

2. Description of the Related Art

An important concern in many fields of engineering and commerce is to determine the most desirable sequence of steps for transitioning a physical system from a beginning state or configuration to an ending state through one or more intermediate states. For example, the system may be a vehicle traveling between specified points, and the objective is to find the fastest route through a group of intermediate points. Another example is a robotic arm used in automated manufacturing operations. The arm's productivity on the assembly line depends directly on being able to compute shortest paths through a general parameter space defined by the arm's degrees of freedom. Further, the system may be a collection of unassembled components of a product, and the objective is to assemble the components in a sequence that requires the least time and materials.

The "cost" associated with a path can therefore represent any quantifiable factor associated with the path and defined in terms of physical parameters of the system. For example, if the objective is to determine the shortest path over terrain and around obstacles, then cost represents the Euclidean distance traveled by the vehicle. If the objective is to minimize exposure of a strike aircraft to enemy radar, then cost can represent the accumulated illumination time over the path traveled. Further, it is well known that an optimization problem with objective (cost) function to be minimized generally can be reformulated as an equivalent problem with an objective (profit) function to be maximized.

In optimization problems it is often possible to model various states of the system as discrete points in a state space. For example, if the system is a vehicle traveling between specified locations, then the state can be defined by the physical coordinates (in two or three dimensions) of the vehicle's location. If the system is a collection of parts being assembled, then the state may be defined as a particular stage of assembly in which certain parts have been joined but not others.

The possible discrete configurations of such a system can be represented by a so-called "directed graph" comprising a set of vertices $V=\{v_1, v_2, \ldots, v_M\}$ and a set of edges $E=\{e_{ij}\}$ in which $e_{ij}$ is an edge from (originating at) vertex $v_i$ to (ending at) $v_j$. Here $M=|V|$ is the number of vertices in the graph. Usually E contains edges for only certain values of i and j. The number N of edges in E may be as large as $M(M-1)$ for a fully connected, directed graph and generally is much larger than M. Often N is a small multiple of M (such as $N=4M$, for example).

Associated with each edge $e_{ij}$ in E is a cost $c_{ij}$ representing the cost for the system to transition from vertex (state) $v_i$ to $v_j$. If the system is a vehicle, the state is the geographical position of the vehicle, and the cost associated with routing the vehicle is simply proportional to the total distance traveled, then the problem can be modeled with $c_{ij}=d(v_i, v_j)$, where $d(,)$ is Euclidean distance. In the explanation presented here the cost associated with each edge is assumed for simplicity to be a positive value. Persons of ordinary skill in the art will appreciate, however, that the method of the present invention can be implemented in the case of negative costs, as well.

Each vertex in the graph G corresponds to a different state of the system, such as a different location through which a vehicle can travel. The edges serve to link the vertices together and thus represent transitions between the various states. In a directed graph the edges are directional; that is, each edge provides a transition between two states in a single direction. If it is possible to move from either of two states to the other, then the graph includes one edge for each direction.

Computational methods using graphs to solve least-cost path problems have existed for decades. Dijkstra's algorithm is a powerful technique that can be implemented to identify a sequence of edges connecting a given source vertex, $v_s$, to a given terminal (or sink) vertex, $v_t$, such that the sum of the costs associated with the edges in the path is a minimum. The computational complexity of Dijkstra's algorithm scales as $O(|V|\log|V|+E)$ and thus is very efficient. This efficiency arises in part, at least, because the edges are selected independently. In other words, each edge along the path is selected from among all edges exiting the given vertex, without regard for the edge on which the system arrived at that vertex.

Unfortunately, many types of optimization problems involve restrictions to prohibit sequences of transitions that are incompatible with the physical limitations of the system. For example, if the optimization problem involves routing a vehicle, a path containing a pair of edges requiring the vehicle to make a 120-degree turn might be infeasible because the vehicle is incapable of making such a sharp turn. Such limitations arise in a wide variety of other least-cost path problems. When routing ground vehicles over free terrain (not on prepared roadways), restrictions often must be placed on changes in vertical angles in order to provide sufficient clearance for the front or back of the vehicle. The routing of a commercial aircraft must consider the sharpness of turns in terms of both stress on the airframe and comfort level of the passengers. For a robotic arm, sharp angular motions can incur joint stresses that can lead to material fatigue, especially when the arm performs a repetitive task as in a manufacturing operation.

Because it relies on independent selection of graph edges to construct a path, Dijkstra's algorithm cannot be used directly for systems involving "hard" constraints on state transitions. Here a constraint is "hard" when it eliminates certain edge sequences from consideration, rather than merely imposing additional costs ("penalties") for using such edge sequences. For example, a constraint on turn sharpness will appear in the model as a limitation on the range of angles between the edge used to enter a vertex and the edges that can be used to exit the vertex.

Generalized forms of Dijkstra's algorithm have occasionally been suggested to allow costs to be associated with edge sequences (such as turns between pairs of edges). Such approaches involve applying a suitable transformation to the graph G to produce a transformed graph G' comprising vertices $v'_{ij}$ representing edges $e_{ij}$ from vertex $v_i$ to vertex $v_j$ in graph G. Each edge $e'_{ijk}$ in G' represents, for example, a transition from a vertex $v'_{ij}$, $v'_{jk}$ and thus corresponds to a pair of edges $e_{ij}$, $e_{jk}$ in G. A cost associated with the edge $e_{ijk}$ in G' therefore corresponds to a cost (or penalty) for traversing the sequence of edges $e_{ij}$, $e_{jk}$. The constrained optimization problem on G is thereby transformed into an unconstrained optimization problem on G'.

In theory, Dijkstra's algorithm could be implemented for the problem on G'. G' is much larger (number of vertices and edges) than G, however, and in fact the computational complexity of the transformed problem scales as $O(|E| |V|)$, i.e., O(NM). This fact has made the transformed graph approaches so time consuming as to be completely useless for any problem of practical size.

A need has therefore existed for a method by which least-cost paths can be determined under hard constraints. Such a method should make it possible to compute (in practical amounts of time) constrained minimum cost routes for vehicles on problems of practical size. Preferably, such a method should be applicable to any form of "cost" that is quantifiable in terms of measurable system parameters and can be represented by positive values.

SUMMARY OF THE INVENTION

The present invention addresses these and other needs by providing a method, system, and software for determining least-cost paths under hard constraints such as turn constraints. The notion of cost is extremely general. As a special case the present invention is able to determine the shortest path (i.e., where cost represents Euclidean distance) over terrain and around obstacles under the condition that no turns in the path exceed a given angle. Arbitrary turn penalties on permitted turn angles can also be included. The invention can be used to find a path for a strike aircraft that minimizes exposure to enemy radar under the condition that no horizontal turn exceeds a given angle and no vertical ascent or descent exceeds a different given angle. Constraints on variables other than angles between consecutive segments of a Euclidean path may also be enforced using the present invention.

The invention achieves these results through two basic procedures. First, the constrained least cost path problem for the physical system is transformed into an unconstrained problem, which can be solved by an implementation of Dijkstra's algorithm. Prior approaches have applied Dijkstra's algorithm to transformed optimization problems, but have been extremely inefficient in practice. The present invention overcomes this drawback by exploiting special relationships between a transformation incorporating hard constraints and data structures that can be suitably tailored to avoid the inefficiencies of prior approaches.

In a first aspect, the present invention provides for finding a least-cost path from a source vertex to a sink vertex in a directed graph representing a plurality of configurations of a physical system. Each edge of the graph has a corresponding cost associated therewith and each vertex of the graph has a corresponding predetermined condition defining for the vertex a reachable range of adjacent vertices of the graph. A method provided by this aspect of the invention comprises retrieving from a priority queue a minimum priority data item indicating a corresponding current vertex of the graph and having an associated priority. The method also comprises identifying from an adjacency list each vertex of the graph adjacent to the current vertex and reachable therefrom in accordance with the predetermined condition corresponding to the current vertex when the current vertex is not the sink vertex, each identified vertex being indicated by a corresponding data item to be inserted into the priority queue with an associated priority.

In a second aspect, the present invention provides for finding a constrained least-cost path from a source vertex to a sink vertex in a directed graph representing a plurality of configurations of a physical system and comprising plural vertices and plural edges between respective vertices. A method provided by this second aspect of the invention comprises retrieving and deleting from a priority queue a minimum priority data item indicating a corresponding current edge of the graph and having an associated priority, the current edge originating at a first vertex of the graph and ending at a second vertex of the graph. The method also comprises identifying from a searchable data structure each edge of the graph adjacent to the current edge and reachable therefrom in accordance with a predetermined condition when the second vertex is not the sink vertex, each identified edge being indicated by a corresponding data item to be inserted into the priority queue with an associated priority.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

The present invention is described in part in A. Boroujerdi and J. Uhlmann, *Empirical Analysis of New Methods for Computing Minimum Cost Paths with Turn Constraints,* PROC. SPIE CONF. ROBOTIC & SEMIROBOTIC GROUND VEHICLE TECHNOLOGY, vol. 3366 at 262–272 (1998) and A. Boroujerdi and J. Uhlmann, *An Efficient Algorithm for Computing Least Cost Paths with Turn Constraints,* INFO. PROCESSING LETTERS, vol. 67 at 317–321 (1998), each of which is incorporated herein by reference and is included in the Appendix attached hereto.

Figure 1A:
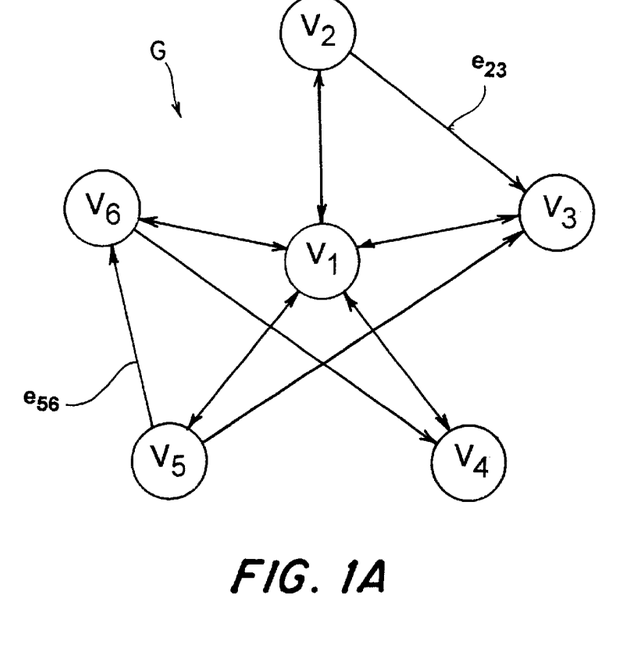
FIG. 1A is an illustration of a typical directed graph G.

FIG. 1A illustrates a typical directed graph G comprising vertices $v_1$ through $v_6$. Different edges $e_{56}$, $e_{23}$, and so forth, connect the vertices $v_1$ through $v_6$ to one another. Some pairs of vertices, such as $v_1$ and $v_6$, are connected by double-ended arrows which represent two edges each, one originating at each vertex of the pair.

Figure 1B:
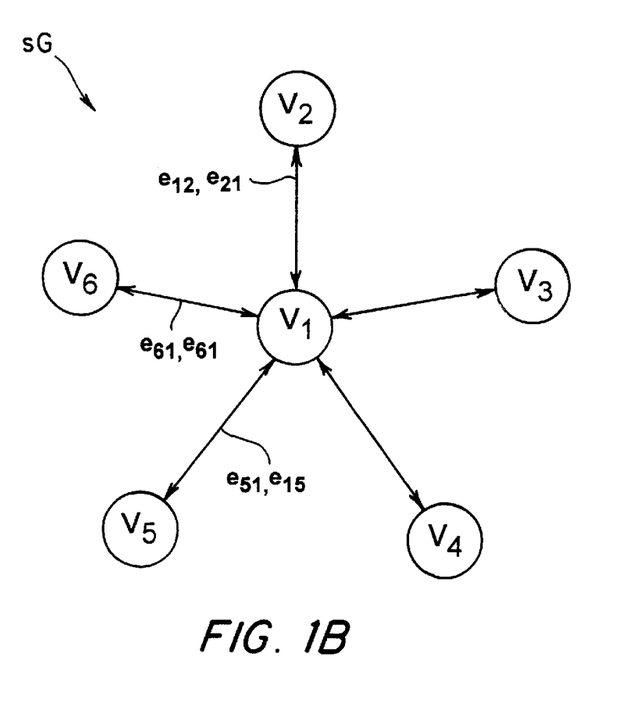
FIG. 1B is an illustration of a subgraph of G.

FIG. 1B illustrates a subgraph sG (i.e., a portion) of directed graph G shown in FIG. 1A. Subgraph sG has been selected from G to include only edges incident upon $v_1$, i.e., $e_{61}$, $e_{16}$ between vertices $v_1$ and $v_6$, edges $e_{21}$, $e_{12}$ between vertices $v_1$ and $v_2$, edges $e_{51}$, $e_{15}$ between vertices $v_1$ and $v_5$, and so forth. These particular edges have been included in sG to simplify the following explanation of how hard constraints such as turn constraints are incorporated into the transformed graph G'.

Figure 1C:
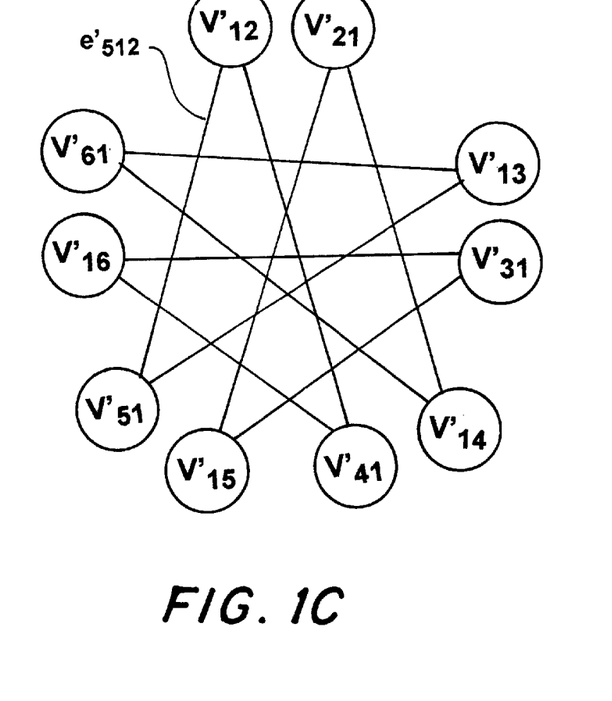
FIG. 1C is an illustration of a subgraph of the transformed graph G' corresponding to the subgraph of FIG. 1B.

FIG. 1C shows a subgraph sG' of such a transformed graph G' in which a turn constraint has been incorporated to eliminate sequences of edges that would produce a turn of greater than 90 degrees. The illustrated subgraph sG' corresponds to the subgraph sG shown in FIG. 1B. As can be seen, sG' includes an edge $e'_{512}$ corresponding to the pair of edges $e_{51}$, $e_{12}$ in sG. On the other hand, no edge in sG' corresponds to the pair of edges $e_{51}$, $e_{16}$; that is, sG' lacks any edge between vertices $v'_{51}$ and $v'_{16}$. This reflects the fact that the pair of transitions $v_5$ to $v_1$ and $v_1$ to $v_6$ includes an angle (between edges $e_{51}$ and $e_{16}$) that would violate the 90-degree turn constraint. Such edge pairs from G are excluded during the construction of the edges in G'.

Figure 2:
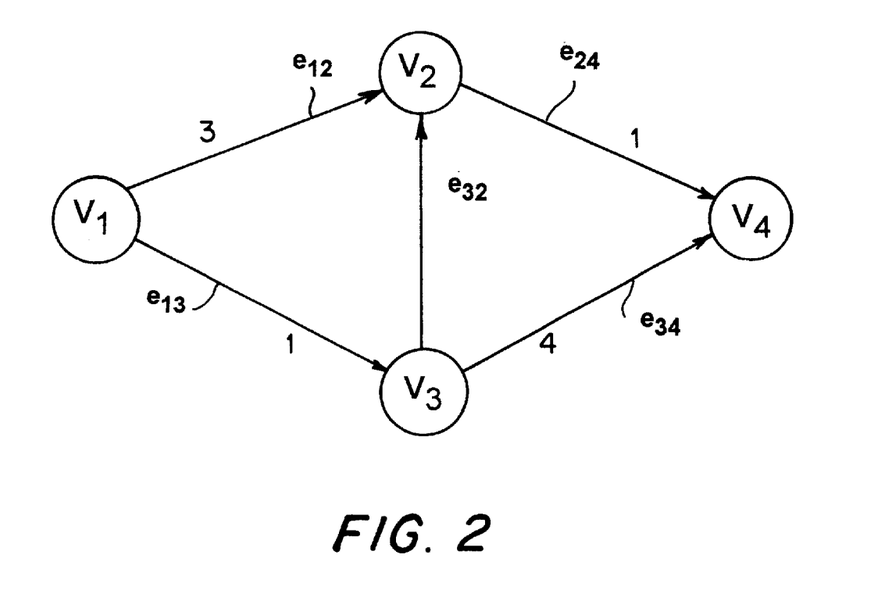
FIG. 2 is an illustration of routing under a turn angle constraint.

FIG. 2 shows an example graph G illustrating how a least-cost path under a hard constraint can differ from an unconstrained least-cost path. Vertices $v_1$ through $v_4$ are connected by edges $e_{12}$, $e_{13}$, $e_{24}$, $e_{34}$, and $e_{32}$. Each of edges $e_{ij}$ has an associated weight: $e_{12}$ has weight 3, $e_{13}$ has weight 1, $e_{24}$ has weight 1, $e_{34}$ has weight 4, and $e_{32}$ has weight 1. It is apparent that the unconstrained least-cost path from $v_1$ to $V_4$ proceeds from $v_1$ to $v_3$ (edge $e_{13}$), from $v_3$ to $v_2$ (edge $e_{32}$), and from $v_2$ to $v_4$ (edge $e_{24}$). The total cost of this unconstrained path is 3.

On the other hand, under the 90-degree turn constraint, edge pairs $e_{13}$, $e_{32}$ and $e_{32}$, $e_{24}$ are prohibited because each would include an angle sharper than 90 degrees. The constrained least-cost path is therefore $v_1$ to $v_2$ (edge $e_{12}$), and $v_2$ to $v_4$ (edge $e_{24}$) and incurs a cost of 4.

Here a given vertex of a graph is said to be "adjacent" to another vertex if an edge of the graph originates at the other vertex and ends at the given vertex. Thus, an "adjacent vertex" for a given vertex is a vertex that can be reached from the given vertex by an edge of the graph. In view of the representation of edges in G by vertices in G', it also makes sense to refer to adjacency among edges. A given edge of the graph is said to be "adjacent" to another edge when the other edge ends at a given vertex of the graph and the given edge originates at the same vertex. That is, an "adjacent edge" for a given edge is an edge that can be used to exit the vertex at which the given edge ends.

A hard constraint prohibits the path of interest from traversing a certain edge under certain conditions. In contrast, an edge penalty merely imposes an additional cost on traversing that edge. The condition embodying the hard constraint can be any computable condition that relates two or more edges of the graph. In a preferred embodiment, the invention uses hard constraints that define allowable turn angles at the vertices of the graph.

For example, if the constraint is a turn angle constraint of 90 degrees, then a specific edge originating from a given vertex is prohibited for the path of interest if the edge traversed to arrive at the graph would form an angle of greater than 90 degrees with the specific edge. Thus, each edge ending at a vertex has an associated "reachable range" of edges originating at the vertex, the "reachable range" of edges being those edges that satisfy the hard constraint condition with respect to the edge ending at the vertex. The "reachable range" of vertices for a given vertex and a given edge is the set of vertices that are adjacent to the given vertex and at which an edge in the reachable range of edges ends.

Although Dijkstra's algorithm itself cannot directly enforce turn constraints, a suitable transformation of the underlying graph G can produce a graph G' in which illegal sequences of edges are structurally eliminated. In other words, the transformation ensures that the application of Dijkstra's algorithm to G' yields a least cost path in G that does not violate the turn constraints.

In general, G' is larger than G, so the critical question is whether the size of G' significantly increases the computational complexity of the constrained least cost path problem over that of Dijkstra's algorithm for the unconstrained problem. As will be shown, least cost constrained paths in two or three dimensions can be computed in $O(|E|\log|V|)$ time, which is comparable to the complexity of Dijkstra's algorithm using a binary heap for the unconstrained problem, but asymptotically less efficient than an $O(|V|\log|V|+|E|)$ implementation of Dijkstra's algorithm using a Fibonacci heap. Thus, the incorporation of hard constraints as achieved by the present invention leads to a dramatic reduction in computational complexity.

Figure 3:
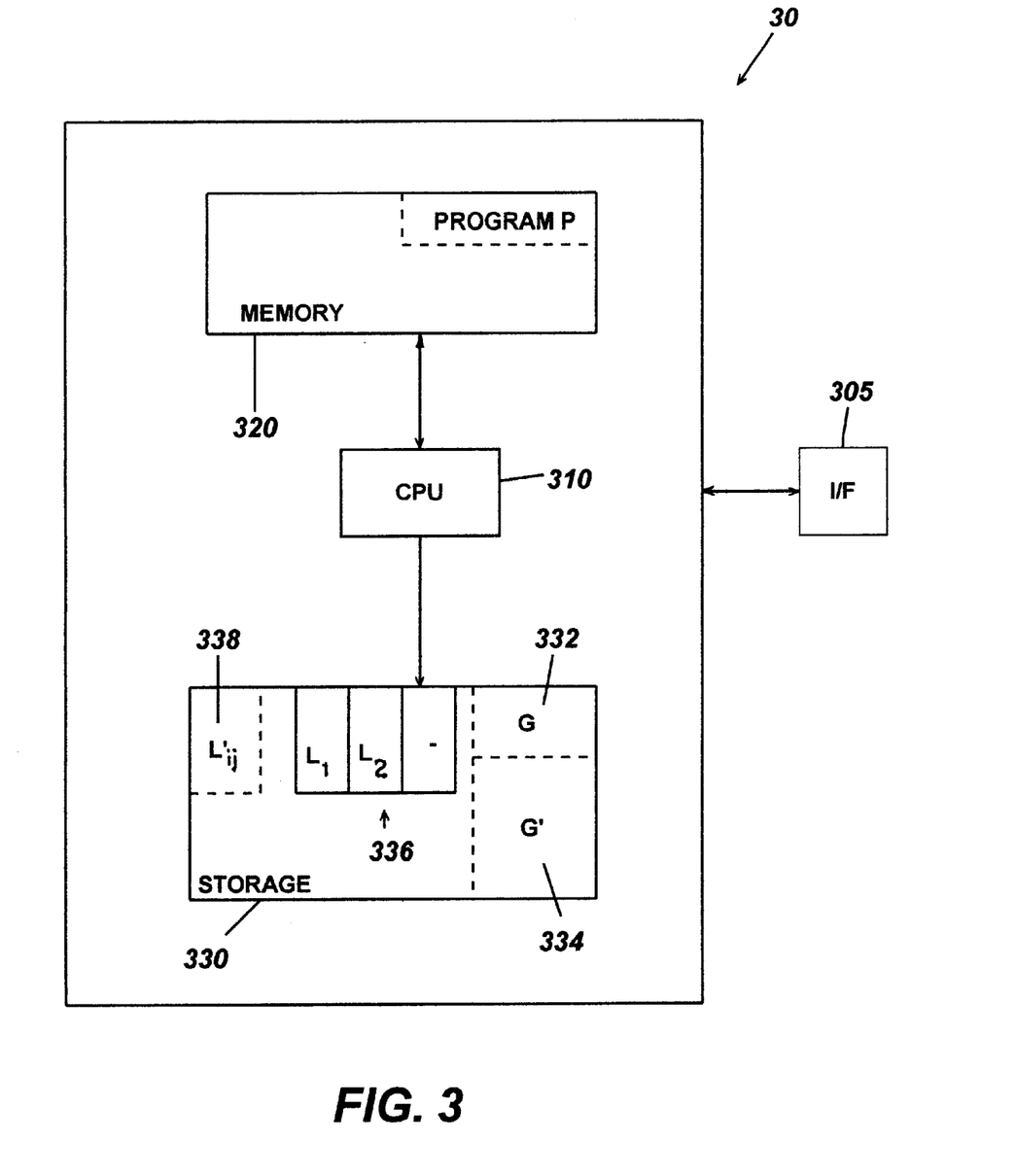
FIG. 3 is a block diagram of a path calculation system according to the present invention.

FIG. 3 is a block diagram of a computational system embodying the present invention. System 30 comprises an interface 305, a processing unit ("processor") such as CPU 310, a memory 320, and a data storage unit such as storage 330. CPU 310 executes a program P stored in memory 320 and comprising procedures for carrying out the computations necessary for determining a constrained least-cost path in the manner to be described. Storage 330 may comprise a mass storage device (e.g., a hard disk drive) or volatile or non-volatile memory. A user (not shown) may interact with system 30 through interface 305, which may include a keyboard and display (not shown).

Storage 330 may include an area 332 for storing data items representing a directed graph G for a specified system, such as a vehicle traversing a given terrain and subject to turn constraints. Area 334 may be included to store the transformed graph G' incorporating the turn constraints. As explained below, each vertex $v_i$ in the graph G has an associated adjacency list $L_i$, which may be stored in a location 336 in storage 330. For a vertex $v_{ij}$ in the transformed graph G', CPU 310 may generate an adjacency list $L'_{ij}$ to be stored in location 338 of storage 330.

The Transformation

Figure 4:
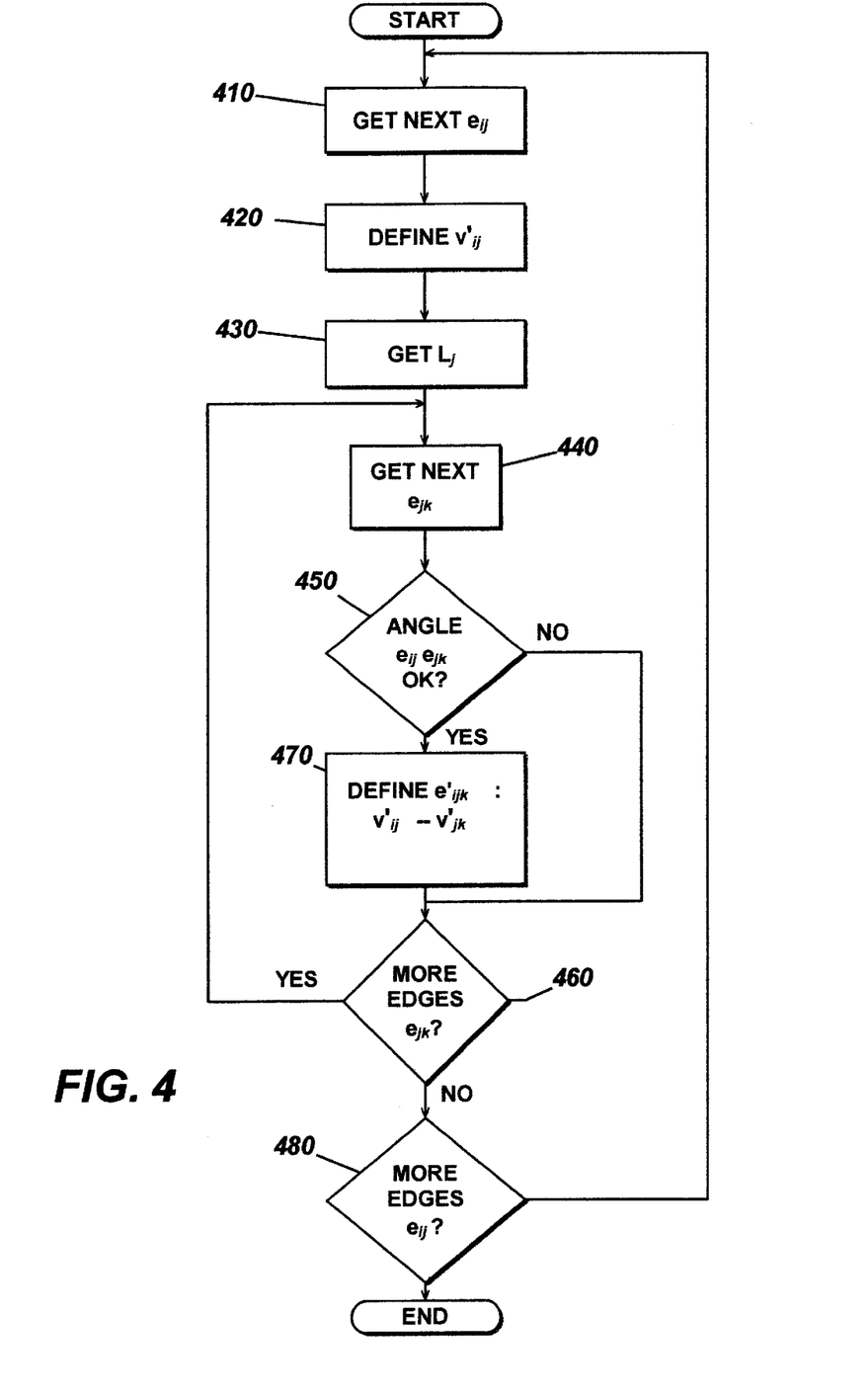
FIG. 4 is a flow chart illustrating construction of a transformed graph G from a directed graph G.

FIG. 4 shows a flow chart for a procedure to construct the transformed graph incorporating hard constraints. This is accomplished as follows:

(1) For each edge $e_{ij}$ in E a corresponding vertex $v_{ij}$ is defined in V'.

(2) For each pair of edges $e_{ij}$ and $e_{jk}$ in E which satisfy the turn constraints a corresponding edge $e'_{ijk}$ is defined in E' from vertex $v'_{ij}$ to $v'_{jk}$.

It is assumed that data items representing the edges and vertices of the original graph are stored. At operation 410, edges $e_{ij}$ are successively retrieved. For the current selected edge, a corresponding vertex $v'_{ij}$ is defined in graph G'. The adjacency list $L_j$ of vertex $v_j$ is retrieved (or generated) at operation 430. Each vertex $v_j$ in $L_j$ has an associated edge $e_{jk}$, which is retrieved at operation 440. Operation 450 tests whether the pair $e_{ij}$, $e_{jk}$ satisfies the hard constraint. If the test fails at operation 450, then operation 460 determines whether more edges associated with list $L_j$ remain to be tested. If so, then the procedure returns to operation 440 and the next edge is retrieved.

It is noted that the present invention is not limited to the exemplary case, presented here, of a single hard constraint on pairs of edges. First, the hard constraint may apply to a sequence of three or more edges, so that each vertex $v_{i \ldots l}$ in the transformed graph would represent an n-tuple of consecutive edges in the original graph. Further, it is not necessary that the same hard constraint be applied at every vertex of the graph G. Also, as noted above, the present invention includes such modifications as incorporation of turn penalties in addition to hard turn constraints.

If operation 450 determines that the pair $e_{ij}$, $e_{jk}$ satisfies the constraint condition, then the procedure executes operation 470 before advancing to operation 460. At operation 470 a new edge $e'_{ijk}$ is added to the transformed graph between vertices $v'_{ij}$ and $v'_{jk}$. Operations 460 and 440 then follow as before, if more edges remain in adjacency list $L_j$.

If operation 460 determines that all edges in list $L_j$ have been tested, the procedure determines at operation 480 whether the original graph G includes more edges $e_{ij}$. If so, then the procedure returns to operation 410 and the next edge is retrieved. If no more edges remain, then the procedure ends.

It is straightforward to verify that $|V'|=|E|$ and $|E'|=d_1 d_1'+d_2 d_2'+ \ldots +d_{|V|} d_{|V|}'$, where $d_i$ is the out-degree and $d_i'$ is the in-degree of vertex $v_i$ in G. In practice, however, G' does not need to be explicitly generated. In fact, the only auxiliary data structures that are required are range search structures, one corresponding to each vertex $v_j$ in V, for efficiently determining which edges $e_{jk}$ are within the constrained angular ranges of a given edge $e_{ij}$. For vertices corresponding to points in two and three dimensions, these range search structures ensure that for each vertex $v'_{ij}$ in V' it is possible to determine all $e'_{ijk}$ in E' in $O(\log|V|+m)$ time, where m is the number of edges emanating from $v'_{ij}$, rather than $O(|V|)$.

Specifically, in two dimensions the required range search structure for vertex $v_i$ can be a balanced binary tree of $d_i$ angles, one for each vertex adjacent to $v_i$. These angles can be determined from an arbitrary zero angle about the spatial point corresponding to vertex $v_i$ (with the usual care taken to accommodate angular query ranges that straddle the zero angle). Thus, the query time is $O(\log d_i+m)$, the preprocessing time is $O(d_i \log d_i)$, and the space requirement is $O(d_i)$.

In k>2 dimensions the range search for vertex $v_i$ is defined by constraints on k−1 angles. As will be discussed, such queries can be satisfied in $O(\log^{k-2} d_i+m)$ with $O(\log^{k-2} d_i)$ time required for the deletion of each retrieved element in the query range. The preprocessing time and space requirement is $O(d_i \log^{k-2} d_i)$. Thus the time complexity in three dimensions is the same as for two dimensions.

The total preprocessing time required to support the implicit generation of G' in two dimensions is $O(\sum_{i=1}^{|V|} d_i \log d_i)$, which is $O(|E|\log|V|)$ since $E = \sum_{i=1}^{|V|} d_i$. For k>2 dimensions the total preprocessing time is $O(|E|\log^{k-2}|V|)$. The space requirement in k dimensions is $O(\sum_{i=1}^{|V|} d_i \log^{k-2} d_i)$, which is $O(|E|\log^{k-2}|V|)$.

Implementing Dijkstra's Algorithm on the Transformed Graph

Figure 5:
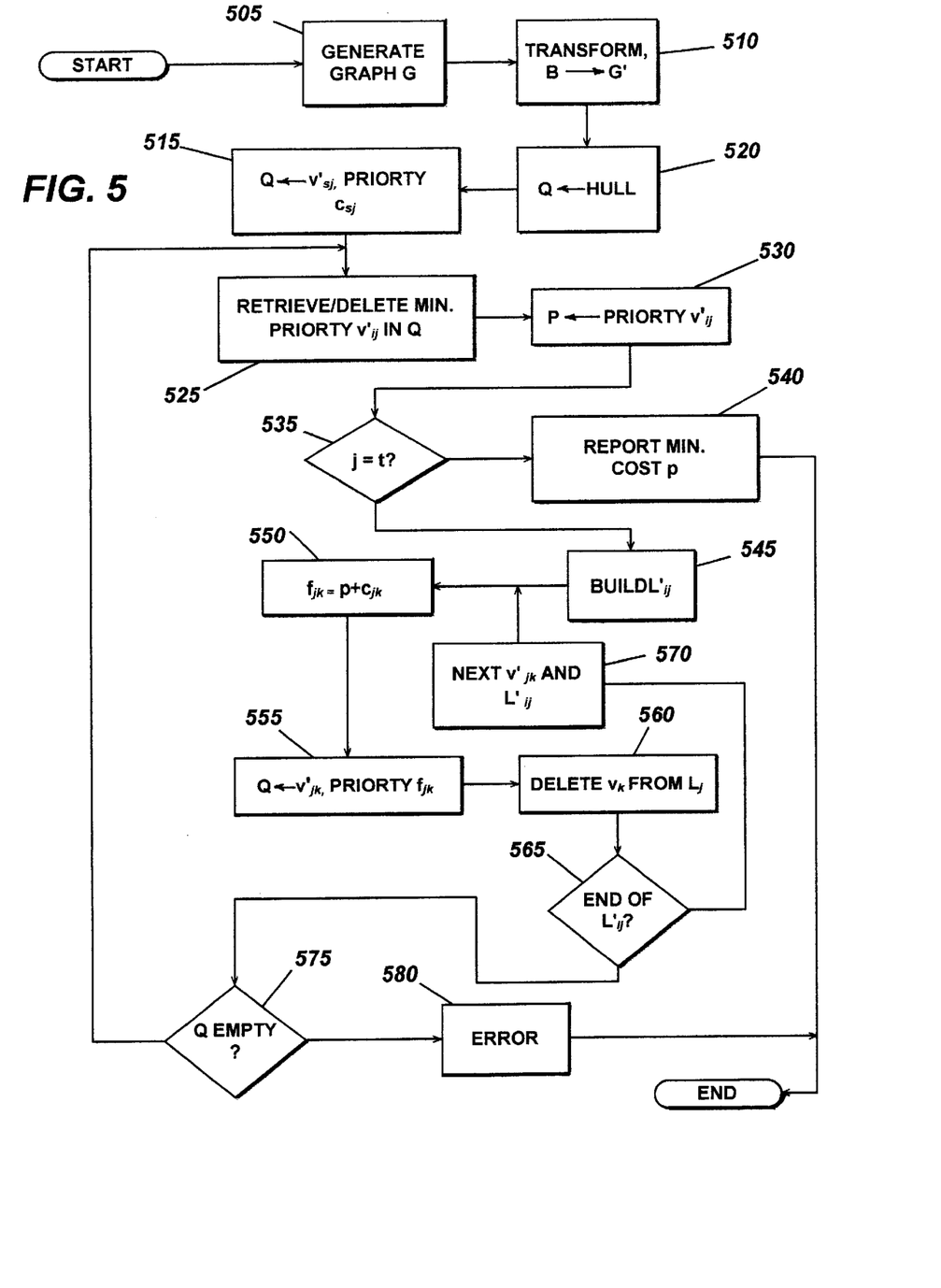
FIG. 5 is a flow chart illustrating an implementation of an explicit method provided by the present invention.

FIG. 5 shows a flow chart for an explicit method implementing the present invention by applying Dijkstra's algorithm to an appropriately formulated graph G'. According to this formulation, it is assumed that sink and source are separated by at least one edge, i.e., $v_s \ne v_t$. Operation 505 is a preprocessing stage where the original directed graph G for the system of interest is generated, along with the adjacency lists $L_i$. Operation 510 corresponds generally to the procedure illustrated in FIG. 4. Operation 515 initializes a priority queue Q with null entries.

A further initialization stage is carried out at operation 520 for each vertex $v_j$ adjacent to source vertex $v_s$. For each $v_j$ in adjacency list $L_s$, vertex $v_{sj}$ is inserted into Q and is assigned a priority given by $c_{sj}$. As noted above, $c_{ij}$ represents the cost associated with edge $e_{ij}$.

The path tracing stage of the procedure begins with operation 525 and continues while Q is not empty. Operation 525 retrieves and deletes from Q a minimum priority vertex $v_{ij}$ (a "current vertex"). Operation 530 assigns path cost p the priority value for the current vertex $v'_{ij}$. At operation 535 it is determined whether vertex $v_j$ (the ending vertex in G for the edge represented by vertex $v'_{ij}$) is the sink vertex $v_t$. If so, then the procedure reports the value of p as the minimum cost at operation 540 and ends.

If $v_j$ is different from $v_t$, then the procedure processes each vertex $v_{jk}$ in the adjacency list $L'_{ij}$ of vertex $v'_{jk}$. At operation 550 a value $f_{jk}$ is set equal to the sum $p+c_{jk}$. The value $f_{jk}$ thus relates to the vertex $v'_{jk}$ and may be saved for later use. The significance of defining a separate parameter $f_{jk}$ will become apparent in the discussion below regarding the practical enhancement illustrated in FIG. 8.

Operation 555 inserts the vertex $v'_{jk}$ into Q with priority given by $f_{jk}$. The vertex $v_k$ is then deleted from the adjacency list $L_j$ for vertex $v_j$ at operation 560. This deletion operation is valid because no other path containing edge $e_{jk}$ in G, corresponding to vertex $v_{jk}$ in G', can have a lower cost.

At operation 565 it is determined whether vertex $v'_{jk}$ was the last vertex of the transformed graph G' in the adjacency list $L'_{ij}$. If not, then the procedure advances to operation 570 where the next vertex $v'_{jk}$ is retrieved for processing. If list $L'_{ij}$ has been completed (conclusion YES at operation 565), then operation 575 determines whether Q contains another entry. In the normal case the conclusion at operation 575 will be YES, because operation 555 will continue to load Q until the sink vertex $v_t$ is reached. The procedure then returns to operation 525 and the next minimum priority vertex is retrieved and deleted from Q. If Q is found to be empty at operation 575, the procedure returns an error message (e.g., no path satisfying the constraints exists) at operation 580 and ends.

The cycle of operations 550-570 relies on having the adjacency list $L'_{ij}$ available. List $L'_{ij}$ can be obtained by performing a range search in the adjacency list $L_j$ for vertex $v_j$ in the original graph G. This range search is performed to identify those edges $e_{jk}$ in the edge set E of G that do not violate the turn constraints with respect to the edge $e_{ij}$ in E.

A key component of the invention is the use of efficient data structures to reduce the computational complexity of the process. Specifically, it is necessary to determine for a given edge leading into vertex i those edges out of vertex i that satisfy the turn constraint. If the turn constraint consists of an angle of 30 degrees in two dimensions, then there will be a 60 degree range of edges out of vertex i that satisfy the constraint. These edges must be examined and then deleted. The deletion step is required only to achieve good scaling. Deletion is not necessary for correctness of the procedure.

In general, therefore, to efficiently find the shortest path that satisfies a given constraint (not necessarily involving angles) between pairs of edges, it is necessary to be able to find for a given edge into vertex i those edges out of vertex i that satisfy the constraint. This requires a data structure that is able to (1) accommodate efficient retrieval of the desired set of edges, and (2) allows the retrieved set to be efficiently deleted from the data structure. Efficiency in this context means that neither the retrieval nor the deletion on average requires examination of most or all of the items stored in the data structure. Data structures such as metric trees can satisfy region queries (of almost any kind) more efficiently than performing a brute force search. These structures can also support efficient deletion operations.

In a particular implementation, the so-called "dynamic fractional cascading" (or "Melhorn-Naher") search structure was used. This particular search structure enabled derivation of the complexity results for three and higher dimensions, as outlined below.

There are many data structures for efficiently satisfying range queries. Here, a "range query" is a query that requires the retrieval of all data points/vectors such that each element falls within a specified range. Examples for multidimensional range queries include but are not limited to kd-trees, range trees, grid structures, hashing structures, various combinations thereof. In one dimension, many of these structures degenerate into either an ordinary binary tree or skip lists. All of these structures are described in standard computer science textbooks and are well understood by those of ordinary skill in computer science.

Many practical constraints can be approximated by a composition of ranges on a fixed number of parameters (or state variables). For example, finding edges in three dimensions that satisfy a general 30 degree turn constraint can be identified by performing a two-dimensional range query to find those edges satisfying the 30 degree constraint in the horizontal plane and the 30 degree constraint in the vertical plane. The small percentage of edges that happen to satisfy the range query but do not satisfy the general 30 degree constraint can then be ignored. For example, two vectors in a plane that is diagonal with respect to the horizontal and vertical planes of the range query may satisfy the range query but have an angle that is too large by as much as a factor square root of two.

The present invention contemplates the use of general search structures (such as metric trees) for general constraints. Included in this range of embodiments are implementations using range search data structures (such as kd-trees) to return a superset of the desired set satisfying the query, where those records in the retrieved set that are not in the desired set are ignored.

In a further generalization, the invention accommodates constraints that involve three or more edges rather than the two-edge turn angle constraint described in the incorporated papers. In such a case the transformation may associate a vertex with every triple of edges in the original graph. More generally, the present invention includes the cases of transformations that associate the vertices of the transformed graph with k-tuples of edges in the original graph, for constraints involving every sequence of k consecutive edges.

Figure 6:
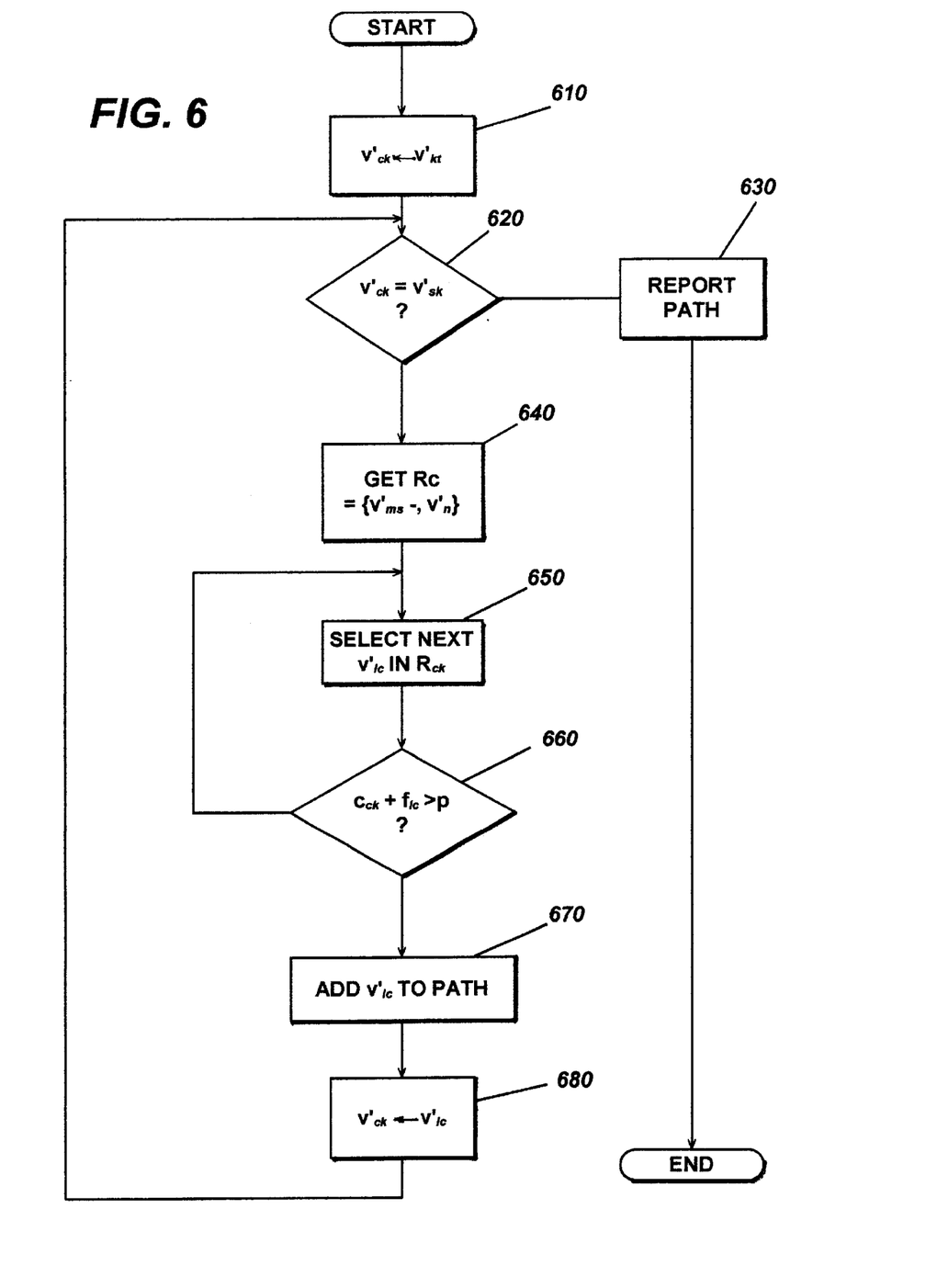
FIG. 6 is a flow chart illustrating a method for constructing a least cost path from the computed least cost.

Although the particular implementation illustrated in FIG. 5 only determines the cost of the least cost path, it is straightforward to obtain the path itself. FIG. 6 is a flow chart of an exemplary procedure for assembling a list of the path vertices for the least-cost path when the cost is known. First the (unconstrained) least-cost path in G' is obtained, and in the course the cost of the path from the source vertex $v'_{sk}$ to each vertex $v'_{ij}$ in the neighborhood of the least-cost path. These values are obtained by saving the values $f_{jk}$ generated by operation 550 in the procedure of FIG. 5. The path in G can then be constructed by replacing each vertex $v_{ij}$ in the least cost path in G' with its corresponding edge $e_{ij}$ in G.

The procedure of FIG. 6 begins at operation 610 by setting a current vertex $v_{ck}$ to the sink vertex $v'_{ks}$. Operation 620 tests whether the current vertex $v'_{ck}$ is the source vertex $v'_{sk}$. If so, then the path is reported at operation 630 and the procedure ends.

If the result of operation 620 is NO, then the procedure advances to operation 640 where a "reverse adjacency" list $R_{ck}$ is obtained for $v'_k$. $R_{ck}$ comprises each vertex $v'_{lc}$ that has $v'_{ck}$ in its adjacency list $L'_{lc}$ and has an assigned value $f_{lc}$. If a value $f_{lc}$ was never assigned to $v'_{lc}$, then $v'_{lc}$ is not a vertex on the least-cost path and can be ignored.

Operation 650 selects the next v' in $R_{ck}$, and operation 660 determines whether $c_{ck}+f_{lc}>p$. If so, then $v'_{ck}$ cannot be on the least cost path, and the procedure returns to operation 650 to select the next v'. If the test at operation 660 fails, then $v'_{lc}$ is known to be on the least-cost path and is added to the path list at operation 670. The procedure then advances to operation 680 where the current vertex $v'_{ck}$ is set to $v'_{lc}$. The procedure then returns to operation 620 to test whether the current vertex is the source vertex.

The computational complexity of the procedure outlined in FIG. 5 can be evaluated as follows. The total number of times loop 525–575 can be executed is bounded by |V'|=|E|. Loop 550–570 is also executed at most |E| times since an edge reported by a range search query is deleted before subsequent queries. Several conclusions follow. First, the overall complexity of the priority queue operations 525 and 555 is $O(|E|\log|V|)$. Second, the overall complexity of the range searching performed in loop 550–570 is $O(|E|\log|V|)$ for two dimensions and $O(|E|\log^{k-2}|V|)$ for k>2 dimensions.

Third, each deletion in operation 560 can be accomplished in $O(\log d_i + m)$ time for two dimensions (deletion from a 1-dimensional binary tree) for an overall complexity of $O(|E|\log|V|)$. In k>2 dimensions the deletion complexity is $O(\log^{k-2} d_i)$ for an overall complexity of $O(|E|\log^{k-2}|V|)$ using the semi-dynamic data structure of in which only deletions (no insertions) are supported. It must be reiterated that k refers to the spatial dimension; the range searching occurs in (k−1)-dimensional angular space.

From the above analysis it has been discovered that the overall scaling of the application of Dijkstra's algorithm to G' solves the turn constrained routing problem in $O(|E|\log|V|)$ time for two and three dimensions and $O(|E|\log^{k-2}|V|)$ time for k>3 dimensions. The key to achieving this complexity is the recognition that each range search data structure can be constructed in batch and then needs only to support deletion and query operations. This permits the use of a highly efficient semi-dynamic variant of the augmented range tree. Further, the use of search data structures in this novel manner has broad applicability to node expansion problems generally where a cost metric is involved It is noted that although only angular constraints have been discussed, constraints on other variables, such as changes in speed, also can be accommodated within the same framework. The only caveats are (1) efficient range search structures only support query regions defined by independent ranges on each variable, and (2) each additional variable incurs an extra log |V| factor on the overall complexity.

Implementation without Transformed Graph Generation

It is interesting that the physically realizable cases of two and three dimensions have the same complexity. Complexity analysis does not necessarily tell the whole story, of course. An important aspect of the present invention is the discovery that a version of Dijkstra's algorithm can be implemented for the transformed problem (incorporating hard constraints into the structure of an unconstrained problem) simply and efficiently without any explicit generation of the transformed graph G'.

Figure 7:
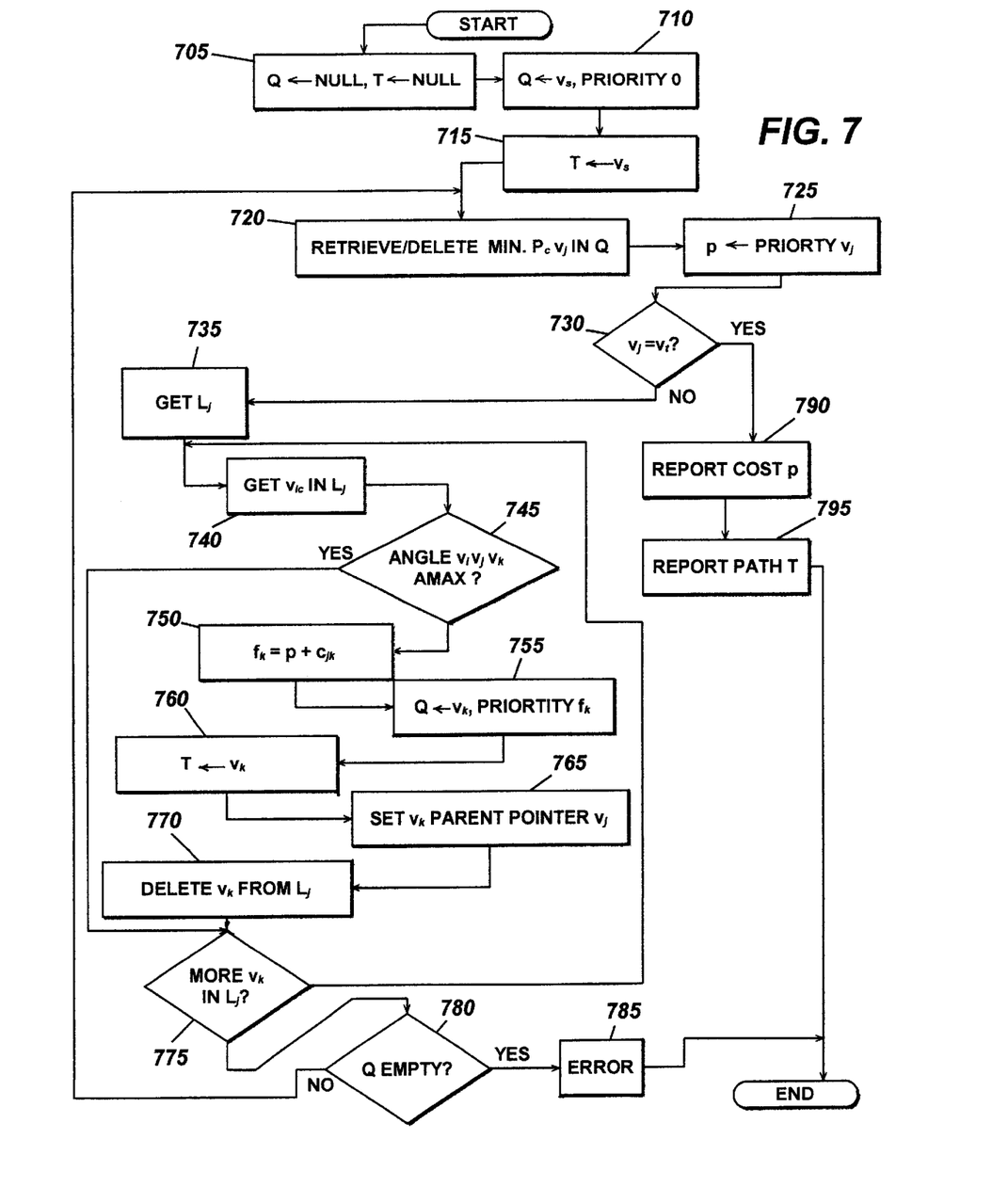
FIG. 7 is a flow chart illustrating an implementation of an implicit method provided by the present invention.

FIG. 7 shows a flow chart for a procedure implementing a method of the present invention in an implicit form. Here it is acceptable for $v_s$ and $v_t$ to be the same vertex. Operation 705 initializes a priority queue Q to null. The particular version of the procedure shown in FIG. 7 also illustrates an alternative for accumulating the least-cost path as the least cost is determined, rather than the reverse process of FIG. 6. Accordingly, operation 705 also initializes a shortest path tree T to null.

Operation 710 inserts source vertex $v_s$ into Q with priority 0. Operation 715 inserts $v_s$ into T. It is noted that $v_s$ is the root of T and hence has no parent.

The subsequent operations somewhat parallel operations 525–580 in FIG. 5, except as noted in detail below. A minimum priority vertex $v_j$ is retrieved and deleted from Q at operation 720. The value p is set to the priority of vertex $v_j$ at operation 725. It is noted that the parent vertex $v_i$ in the least-cost path is already added to tree T, due to the looping that begins at operation 720.

Operation 730 tests whether vertex $v_j$ is the sink vertex $v_t$. If not, the procedure advances to operation 735 where the adjacency list $L_j$ is retrieved. Operation 740 selects a next vertex $v_k$ in $L_j$. Operation 745 tests whether angle $v_i v_j v_k$ is greater than a maximum angle AMAX permitted by the turn constraint. An important advantage of the present invention is that this selection and testing sequence can be performed efficiently by using an appropriate data structure for adjacency list $L_j$.

If angle $v_i v_j v_k$ satisfies the turn constraint at operation 745, then operation 750 sets value $f_k$ equal to $p+c_{jk}$. Here the $f_k$ values are associated with vertices $v_k$, whereas in the embodiment of FIG. 5 the values $f_{jk}$ are associated with vertices $v_{jk}$. Operation 755 then inserts $v_k$ into Q with priority $f_k$, and operation 760 inserts $v_k$ into tree T. At operation 765 the parent pointer of $v_k$ is set to $v_j$, and at operation 770 vertex $v_k$ is deleted from adjacency list $L_j$.

The procedure advances from operation 770 to operation 775, which tests whether more vertices $v_k$ remain to be tested in $L_j$. If so, then the procedure returns to operation 740 and the next $v_k$ is retrieved. If operation 745 determines that angle $v_i v_j v_k$ violates the turn constraint given by AMAX, then the procedure also advances to operation 775.

If operation 775 determines that no more $v_k$ remain to be tested in $L_j$, then the procedure advances to operation 780 where it is determined whether Q contains more vertices. If so (the normal case), the procedure returns to operation 720 to retrieve the next vertex with minimum priority. The queue Q should always remain non-empty until the sink vertex $v_t$ is reached, so if Q is empty at operation 780 then the procedure reports an error (e.g., no path satisfying the constraints exists) at operation 785. From the error report at operation 785 the procedure ends.

If $v_j$ is the sink, then the minimum cost p is reported at operation 790 and the minimum cost path is obtained (in reverse order) at operation 795 by following the parent pointers from $v_j$ to $v_s$ in T. The procedure then ends.

The seemingly large amount of bookkeeping suggested by the description of the constraint enforcement transformation in the embodiment of FIG. 5 is completely avoided in the above implementation. In particular, although each vertex $v_i$ may appear multiple times in the priority queue (once for each incoming edge), the different occurrences are uniquely distinguished in the shortest path tree. Even more surprising is the fact that the implementation is actually simpler than Dijkstra's algorithm, because there are no priority queue decrease-key operations; thus, a simpler, more efficient heap structure can be used.

The only component of the algorithm that is not trivial to implement is the range search structure for three and higher dimensions. In two dimensions the one-dimensional range search structure on angles is simply an ordinary binary tree. However, in three and higher dimensions the structure is somewhat more sophisticated. In most practical three-dimensional routing problems, such as some types of aircraft routing, the discretization of the space produces graphs with substantially fewer edges in the vertical plane than in the horizontal plane. If the discretization in the vertical plane is sufficiently low, it may be more efficient simply to perform a one-dimensional range search on the horizontal angles and then return only those elements which also satisfy the vertical angular constraint.

Fortunately, each data structure can be constructed in a batch process that involves little more than several sorting operations. Because the structure only needs to be semi-dynamic, the deletion algorithm performs very little maintenance on the data structure and is relatively straightforward.

A Practical Enhancement

The procedures discussed thus far are efficient in the worst case, but there is some room for improving the average case performance. It is noted that Dijkstra's algorithm successively expands its search from the vertex v on the priority queue whose path from the source has minimum cost. In the following discussion, the cost of this path will be denoted $g(v)$. If a lower bound estimate can be obtained on the cost of the path from v to the sink, denoted $h(v)$, then it is possible to define a more efficient expansion criterion. Specifically, it can be shown that expanding the vertex v on the queue that minimizes the function $f(v)=g(v)+h(v)$ will yield an optimal solution, as long as $h(v)$ satisfies the lower bound condition. The important fact is that any $h(\ )>0$ will reduce the number of vertices examined by Dijkstra's algorithm. The problem of course is to identify a suitable h-function.

In general applications of Dijkstra's algorithm, it is impossible to obtain a nontrivial lower bound on the cost of the path from a given vertex to the sink. However, when Dijkstra's algorithm is applied to find constrained paths, as it is in the present invention, it has been discovered that it is always possible to use the cost of the unconstrained path as a lower bound. This simply requires a preprocessing step in which Dijkstra's algorithm is used to find the least cost unconstrained path from each vertex to the sink. The cost of the unconstrained path from each vertex v to the sink then becomes the value of $h(v)$.

Figure 8:
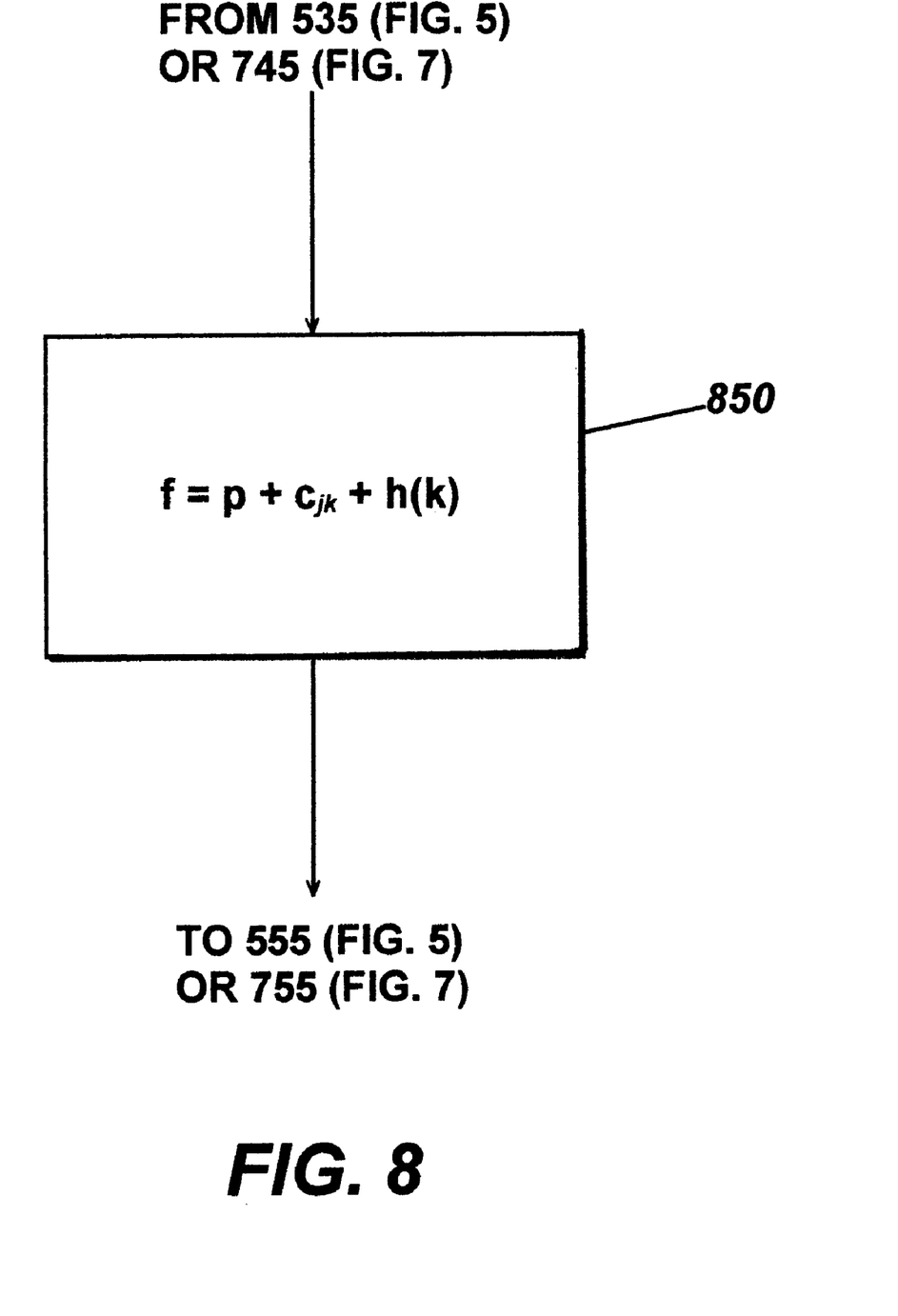
FIG. 8 is a flow chart illustrating a practical enhancement for the methods of FIGS. 4 and 6.

FIG. 8 is a flow chart segment illustrating a modification to the procedures of either FIG. 5 or FIG. 7. From operation 535 or 745, the modified procedure replaces operation 550 or 750 with two substitute stages. An off-line preprocessing operation (not shown) is assumed in which the unconstrained least-cost path, and thus $h(k)$, is determined for each vertex $v_k$ to the sink. It is well known to persons of ordinary skill that unconstrained Dijkstra can be run once to obtain the shortest (least-cost) path from each vertex of the graph to the sink vertex. Operation 850 then sets the value $f_v$ (either $f_{jk}$ for enhancement of the procedure of FIG. 5 or $f_k$ for enhancement of the procedure of FIG. 7) equal to the sum $p+c_{jk}+h(k)$. The modified procedure then advances to operation 555 or operation 755, as before.

The number of vertices examined during the course of the procedure based on FIG. 8 is strongly affected by the quality of the h-function estimates. If they are perfect, then the number of vertices examined will be proportional to the number of edges in the minimum cost path. If $h(v)=0$ is assumed for all v, which is implicitly what is done in conventional Dijkstra's algorithm, then almost every vertex will be examined. Thus, the h-function can be expected to provide less benefit for graphs in which least cost constrained paths deviate greatly from the least cost unconstrained paths.

The computational complexity provided by the present invention in two and three dimensions is comparable to the best implementations of the unconstrained Dijkstra's algorithm and is substantially better than the $O(|E|\,|V|)$ algorithm for the more general problem of routing with turn penalties. More specifically, in practical routing problems $|E|$ is $O(|V|)$, which implies that the complexity for respecting general turn penalty costs is $O(|V|^2)$. On the other hand, the method provided by the present invention has complexity $O(|V|\log|V|)$.

A further advantage can often be realized in practical applications of the invention. In particular, much of the computation time for the method is spent on overhead for the construction of the search structures. In systems in which routing is performed repeatedly on the same graph, this computational overhead is incurred only once.

Because traditional constrained routing approaches scale quadratically with graph size, they can only be applied in off-line applications. The $O(|V|\log|V|)$ scaling provided by the present invention, however, reduces the computational time for constrained routing in large graphs from hours to seconds. This performance is sufficient to allow, for example, an autonomous vehicle to dynamically re-route as it simultaneously senses its environment. An autonomous vehicle without this capability was recently deployed in the Mars Pathfinder mission, which illustrates one of many areas of application for the present invention. Such a capability can provide dramatic improvements in the overall quality of the traversed routes, as well as permitting much greater tasking flexibility over vehicles operating in novel environments.

In addition to the improved computational complexity, the present invention accommodates a practical enhancement that leads to substantial reductions in computation time for realistic scenarios. More specifically, the enhancement will tend to improve performance in all but the most extreme cases in which the turn constraints lead to highly circuitous routes. Test results have demonstrated substantial combined benefits from the improved algorithmic complexity from the present invention and the improved practical performance provided by the enhancement.

The present invention accordingly provides a method and system capable of solving a class of constrained routing problems on very large scale graphs. This class of problems covers a wide variety of important land and air routing applications which previously could only be addressed using heuristic methods.

What is claimed is:

1. A method for finding a constrained least-cost path from a source vertex to a sink vertex in a directed graph representing a physical system, the graph having multiple vertices located between the source vertex and the sink vertex, each vertex of the graph having a corresponding searchable data structure identifying a set of adjacent vertices, each vertex of the graph being connected by an edge to another vertex, and each edge having an associated cost, the method comprising:
   (a) inserting a data item with an associated priority of zero corresponding to the source vertex into an initially empty priority queue;
   (b) retrieving and deleting from the priority queue a minimum priority data item indicating a current vertex of the graph and having an associated priority;
   (c) identifying from the corresponding searchable data structure each vertex of the graph adjacent to the current vertex and reachable therefrom in accordance with a predetermined condition;
   (d) deleting an identified adjacent vertex from the corresponding searchable data structure;
   (e) inserting into the priority queue a corresponding data item with an associated priority for the identified adjacent vertex without replacing any data item associated with the identified adjacent vertex that is already in the priority queue;
   (f) repeating steps (b) through (e) until the current vertex is the sink vertex, and
   (g) when the current vertex is the sink vertex, determining the least cost-path from the minimum priority of the data item associated with the sink vertex.

2. A method according to claim 1, wherein the searchable data structure can return a desired set of vertices satisfying a range query without examining all vertices in the searchable data structure and wherein a returned set of data items is deleted from the searchable data structure.

3. A method according to claim 1, wherein:
   the searchable data structure allows the use of range queries to return a subset of adjacent vertices, the subset including each adjacent vertex reachable from the current vertex; and
   identification of the reachable adjacent vertices includes ignoring each adjacent vertex failing to satisfy the predetermined condition.

4. A method according to claim 1, wherein each vertex of the directed graph represents a geographical position of a vehicle.

5. A method according to claim 1, wherein the predetermined condition for the current vertex limits the adjacent vertices that are reachable based on a specified relationship between a plurality of consecutive edges of the graph, ending with the edge between the current vertex and an adjacent vertex.

6. A method according to claim 5, wherein the plurality of consecutive edges comprises three consecutive edges.

7. A method according to claim 1, wherein the set of adjacent vertices reachable from the current vertex is determined by a composition of ranges of a predetermined number of state variables, each state variable representing a parameter of the physical system.

8. A method according to claim 1, wherein each data item inserted into the priority queue has an associated priority defined by a sum of the associated priority of the retrieved data item and the cost of the edge from the current vertex to the adjacent vertex corresponding to the inserted data item.

9. A method for finding a constrained least-cost path from a source vertex to a sink vertex in a directed graph representing a physical system and comprising plural vertices and plural edges between respective vertices, each vertex of the graph having a corresponding searchable data structure identifying a set of adjacent vertices, each vertex of the graph being connected by an edge to another vertex and each edge having an associated cost, the method comprising:
   for each vertex adjacent to the source vertex, inserting into an initially empty priority queue a data item with a priority equal to the cost of the edge from the source vertex to the adjacent vertex;
   retrieving and deleting from the priority queue a minimum priority data item indicating a current edge of the graph;
   if the current edge does not terminate at the sink vertex, identifying from the searchable data structure each edge of the graph adjacent to the current edge and reachable therefrom in accordance with a predetermined condition;
   inserting into the priority queue a data item with an associated priority for each identified adjacent edge without replacing any data item associated with the identified adjacent edge that is already in the priority queue;

deleting from the searchable data structure each vertex at which an identified adjacent edge terminates;

continuing to retrieve a minimum priority data item from the priority queue, identify all edges reachable from the current edge, to insert a data item with an associated priority for each identified adjacent edge into the priority queue, and to retrieve a minimum priority item from the priority queue until the current edge terminates at the sink vertex; and determining the least-cost path from the priority of the data item associated with the edge terminating at the sink vertex.

10. A method according to claim 9, wherein the searchable data structure can return a set of vertices satisfying a range query without examining all vertices in the searchable data structure and wherein the returned set of vertices is deleted from the searchable data structure.

11. A method according to claim 9, wherein the searchable data structure allows the use of range queries to return a subset of adjacent vertices, the subset including only adjacent vertices reachable from a current vertex in accordance with a predetermined condition.

12. A method according to claim 9, wherein each vertex of the directed graph represents a geographical position of a vehicle.

13. A method according to claim 9, wherein the predetermined condition for the current edge limits the adjacent edges that are reachable from the current edge based on a specified relationship between a plurality of consecutive edges of the graph ending with the adjacent edge.

14. A method according to claim 13, wherein the plurality of consecutive edges comprises three consecutive edges.

15. A method according to claim 9, wherein the set of adjacent edges reachable from the current edge is determined by a composition of ranges of a predetermined number of state variables, each state variable representing a parameter of the physical system.

16. A method according to claim 9, wherein each data item inserted into the priority queue has an associated priority defined by a sum of the priority of the retrieved data item and a cost for the identified edge corresponding to the inserted data item.

17. A system for finding a constrained least-cost path from a source vertex to a sink vertex in a directed graph representing a physical system, the graph having multiple vertices located between a source vertex and a sink vertex, each vertex of the graph having a corresponding searchable data structure identifying a set of adjacent vertices, each vertex of the graph being connected by an edge to another vertex, and each edge having an associated cost, the method comprising:

a storage storing a searchable data structure of one or more data items respectively indicating vertices adjacent to a current vertex of the graph; and a processor inserting a data item with an associated priority of zero corresponding to the source vertex into an initially empty queue, said processor retrieving and deleting from a priority queue a minimum priority data item indicating a current vertex of the graph and having an associated priority, said processor identifying from the corresponding searchable data structure each vertex of the graph adjacent to the current vertex and reachable therefrom in accordance with a predetermined condition when the current vertex is not the sink vertex, said processor deleting an identified vertex from the corresponding searchable data structure, said processor inserting into the priority queue a corresponding data item with an associated priority for the identified adjacent vertex without replacing any data item associated with the identified adjacent vertex that is already in the priority queue, said processor continuing this process until the current vertex is the sink vertex, said processor determining a minimum priority from the data item associated with the sink vertex and converting the minimum priority into the least-cost path.

18. A system according to claim 17, wherein the searchable data structure can return a desired set of vertices satisfying a range query without examining all vertices in the searchable data structure and wherein a returned set of data items is deleted from the searchable data structure.

19. A system according to claim 17, wherein:

the searchable data structure allows the use of range queries to return a subset of adjacent vertices, the subset including each adjacent vertex reachable from the current vertex; and said processor ignores each adjacent vertex failing to satisfy the predetermined condition when identifying the reachable vertices adjacent to the current vertex.

20. A system according to claim 17, wherein each vertex of the directed graph represents a geographical position of a vehicle.

21. A system according to claim 17, wherein the predetermined condition for the current vertex limits adjacent vertices that are reachable based on a specified relationship between a plurality of consecutive edges of the graph, ending with the edge between the current vertex and an adjacent vertex.

22. A system according to claim 21, wherein the plurality of consecutive edges comprises three consecutive edges.

23. A system according to claim 17, wherein the set of adjacent vertices reachable from the current vertex is determined by a composition of ranges of a predetermined number of state variables, each state variable representing a parameter of the physical system.

24. A system according to claim 17, wherein said processor further performs:

inserting into the priority queue the corresponding data item indicating each identified vertex; and associating with each inserted data item a priority defined by a sum of the priority of the retrieved data item and the cost of the edge from the current vertex to the adjacent vertex corresponding to the inserted data item.

25. A system for finding a constrained least-cost path from a source vertex to a sink vertex in a directed graph representing a physical system, the graph having multiple vertices located between a source vertex and a sink vertex, each vertex of the graph having a searchable data structure identifying a set of adjacent vertices, each vertex of the graph being connected by an edge to another vertex, and each edge having an associated cost, the method comprising:

a storage storing data structure searchable for one or more data items respectively indicating vertices adjacent to a current vertex of the graph; and a processor inserting a data item into a priority queue for each vertex adjacent to the source vertex, the inserted data item having a priority equal to the cost of the edge from the source vertex to the adjacent vertex, said processor retrieving and deleting from the priority queue a minimum priority data item indicating a current edge of the graph, said processor identifying from the data structure each edge of the graph adjacent to the current edge and reachable therefrom in accordance with a predetermined condition when the current edge does not terminate at the sink vertex, said processor inserting into the priority queue a corresponding data with an associated priority for each identified edge without replacing any data item associate with the identified adjacent edge that is already in the priority queue said processor deleting from the searchable data structure each vertex at which an identified adjacent edge terminates, said processor continuing this process until the current edge terminates at the sink vertex, said processor converting the priority from the data item associated with the sink vertex into the least-cost path.

26. A system according to claim 25, wherein the searchable data structure can return a desired set of vertices satisfying a range query without examining all vertices in the searchable data structure and wherein a returned set of data items is deleted from the searchable data structure.

27. A system according to claim 25, wherein:
   the searchable data structure allows the use of range queries to search the data structure and return a subset of adjacent vertices, the subset including each reachable from the current vertex; and
   said processor ignores each adjacent vertex failing to satisfy the predetermined condition when identifying the reachable vertices adjacent to the current vertex.

28. A system according to claim 25, wherein each vertex of the directed graph represents a geographical position of a vehicle.

29. A system according to claim 25, wherein the predetermined condition for the current edge limits the adjacent edges that are reachable from the current edge based on a specified relationship between a plurality of consecutive edges of the graph, ending with the adjacent edge.

30. A system according to claim 25, wherein the plurality of consecutive edges comprises three consecutive edges.

31. A system according to claim 25, wherein the edges reachable from the current edge comprise a range represented by a composition of ranges of a predetermined number of state variables, each state variable representing a parameter of the physical system.

32. A system according to claim 25, wherein said processor further associates with each inserted data item priority defined by a sum of the priority of the retrieved data item and the cost for the identified edge corresponding to the inserted data item.

33. A computer-readable medium encoded with a program for finding a constrained least-cost path from a source vertex to a sink vertex in a directed graph a physical system, the graph having multiple vertices located between the source vertex and the sink vertex, each vertex of the graph having a corresponding searchable data structure identifying a set of adjacent vertices, each vertex being connected by an edge to another vertex, and each edge of the graph having a corresponding cost associated therewith, said program comprising procedures for:
   (a) inserting a data item with an associated priority of zero corresponding to the source vertex into an initially empty priority queue;
   (b) retrieving and deleting from the priority queue a minimum priority data item indicating a current vertex of the graph and having an associated priority;
   (c) identifying from the searchable data structure each vertex of the graph adjacent to the current vertex and reachable therefrom in accordance with a predetermined conditions
   (d) deleting an identified adjacent vertex from the corresponding searchable data structure;
   (e) inserting into the priority queue a corresponding data item with an associated priority for the identified adjacent vertex without replacing any data item associated with the identified adjacent vertex that is already in the priority queue;
   (f) repeating procedures (b) through (e) until the current vertex is the sink vertex;
   (g) when the current vertex is the sink vertex, determining the minimum priority from the data item associated with the sink vertex and converting the minimum priority into the least-cost path.

34. A computer-readable medium according to claim 33, wherein the searchable data structure can return a desired set of vertices satisfying a range query without examining all vertices in the searchable data structure and wherein a returned set of data items is deleted from the searchable data structure.

35. A computer-readable medium according to claim 33, wherein:
   the searchable data structure allows the use of range queries to return a subset of adjacent vertices, the subset including each adjacent vertex reachable from the current vertex; and
   identification of the reachable adjacent vertices includes ignoring each adjacent vertex failing to satisfy the predetermined condition.

36. A computer-readable medium according to claim 33, wherein each vertex of the directed graph represents a geographical position of a vehicle.

37. A computer-readable medium according to claim 33, wherein the predetermined condition for the current vertex limits the adjacent vertices that are reachable based on a specified relationship between a plurality of consecutive edges of the graph, ending with the edge between the current vertex and an adjacent vertex.

38. A computer-readable medium according to claim 37, wherein the plurality of consecutive edges comprises three consecutive edges.

39. A computer-readable medium according to claim 33, wherein the set of adjacent vertices reachable from the current vertex is determined by a composition of ranges of a predetermined number of state variables, each state variable representing a parameter of the physical system.

40. A computer-readable medium according to claim 33, wherein said program further associates with each inserted data item a priority defined by a sum of the priority of the retrieved data item and the cost of the edge from the current vertex to the adjacent vertex corresponding to the inserted data item.

41. A computer-readable medium encoded with a program for finding a constrained least-cost path from a source vertex to a sink vertex in a directed graph representing a physical system and comprising plural vertices and plural edges between respective vertices, each vertex of the graph having a corresponding searchable data structure identifying a set of adjacent vertices, each vertex of the graph being connected by an edge to another vertex, and each edge having an associated cost, said program comprising procedures:
   for each vertex adjacent to the source vertex, inserting into an initially empty priority queue a data item with a priority equal to the cost of the edge from the source vertex to the adjacent vertex;
   retrieving and deleting from the priority queue a minimum priority data item indicating a current edge of the graph;

if the current edge does not terminate at the sink vertex, identifying from the searchable data structure each edge of the graph adjacent to the current edge and reachable therefrom in accordance with a predetermined condition;

inserting into the priority queue a data item with an associated priority for each identified adjacent edge without replacing any data item associated with the identified adjacent edge that is already in the priority queue;

deleting from the searchable data structure each vertex at which an identified adjacent edge terminates;

continuing to retrieve a minimum priority data item from the priority queue, identify all edges reachable from the current edge, insert into the priority queue a data item with an associated priority for each identified adjacent edge, and retrieve a minimum priority data item from the priority queue until the current edge terminates at the sink vertex, and converting the priority from the data item associated with the sink vertex into the least-cost path.

42. A computer-readable medium according to claim 41, wherein the searchable data structure can return a set of vertices satisfying a range query without examining all vertices in the searchable data structure and wherein the returned set of vertices is deleted from the searchable data structure.

43. A computer-readable medium according to claim 42, wherein the searchable data structure allows the use of range queries to return a subset of adjacent vertices, the subset including only adjacent vertices reachable from a current vertex in accordance with a predetermined condition.

44. A computer-readable medium according to claim 41, wherein each vertex of the directed graph represents a geographical position of a vehicle.

45. A computer-readable medium according to claim 41, wherein the predetermined condition for the current edge limits the adjacent edges that are reachable from the current edge based on a specified relationship between a plurality of consecutive edges of the graph, ending with the adjacent edge.

46. A computer-readable medium according to claim 45, wherein the plurality of consecutive edges comprises three consecutive edges.

47. A computer-readable medium according to claim 41, wherein the set of adjacent edges reachable from the current edge is determined by a composition of ranges of a predetermined number of state variables, each state variable representing a parameter of the physical system.

48. A computer-readable medium according to claim 41, wherein said program further associates with each inserted data item a priority defined by a sum of the priority of the retrieved data item and the cost of the identified edge corresponding to the inserted data item.

49. A method according to claim 1, further comprising:
computing for each non-sink vertex of the directed graph an h-value representing a cost of an unconstrained least cost path from the non-sink vertex to the sink vertex; and associating with each inserted data item a priority defined by a sum of the priority of the retrieved data item, a cost of the edge from the current vertex to the adjacent vertex, and the h-value for the adjacent vertex.

50. A method according to claim 9, further comprising:
computing for each non-sink vertex of the directed graph an h-value representing a cost of an unconstrained least cost path from the non-sink vertex to the sink vertex; and associating with each inserted data item a priority defined by a sum of the priority of the retrieved data item, a cost of the identified edge, and the h-value for the vertex at which the identified edge ends.

51. A method according to claim 1, wherein each vertex of the directed graph represents a spatial position of a portion of a robotic arm.

52. A method according to claim 9, wherein each vertex of the directed graph represents a spatial position of a portion of a robotic arm.

53. A system according to claim 17, wherein each vertex of the directed graph represents a spatial position of a portion of a robotic arm.

54. A system according to claim 17, wherein each data item said processor inserts into the priority queue has an associated priority equal to the sum of the priority of the retrieved data item, the cost of the adjacent edge corresponding to the inserted data item and a lower bound estimate on the cost of a least-cost path from the adjacent vertex to the sink vertex.

55. A system according to claim 25, wherein each vertex of the directed graph represents a spatial position of a portion of a robotic arm.

56. A system according to claim 25, wherein each data item said processor inserts into the priority queue has an associated priority equal to the sum of the priority of the retrieved data item, the cost of the adjacent edge corresponding to the inserted data item and a lower bound estimate on the cost of a least-cost path from the adjacent vertex to the sink vertex.

57. A computer-readable medium according to claim 33, wherein each vertex of the directed graph represents a spatial position of a portion of a robotic arm.

58. A computer-readable medium according to claim 33, wherein each data item said processor inserts into the priority queue has an associated priority equal to the sum of the priority of the retrieved data item, the cost of the adjacent edge corresponding to the inserted data item and a lower bound estimate on the cost of a least-cost path from the adjacent vertex to the sink vertex.

59. A computer-readable medium according to claim 41, wherein each vertex of the directed graph represents a spatial position of a portion of a robotic arm.

60. A computer-readable medium according to claim 41, wherein each data item said processor inserts into the priority queue has an associated priority equal to the sum of the priority of the retrieved data item, the cost of the adjacent edge corresponding to the inserted data item and a lower bound estimate on the cost of a least-cost path from the adjacent vertex to the sink vertex.

* * * * *